F. H. CHASE.
STAMP CABINET.
APPLICATION FILED JULY 17, 1908.
920,913.
Patented May 11, 1909.
4 SHEETS—SHEET 1.
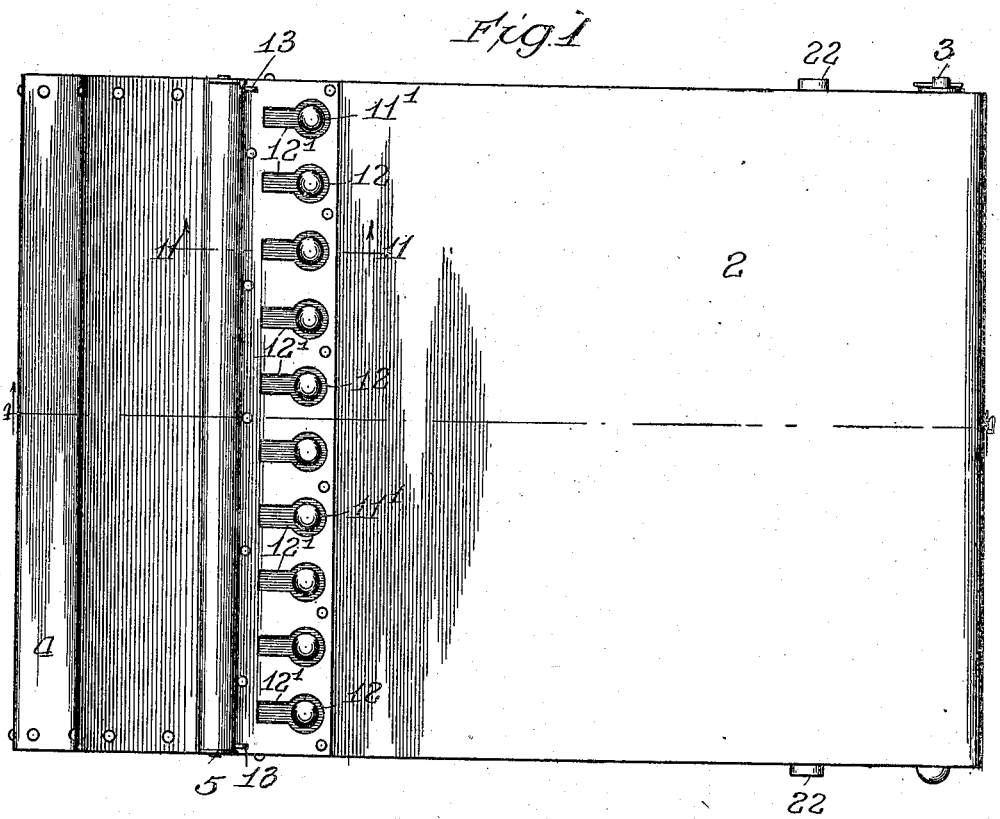
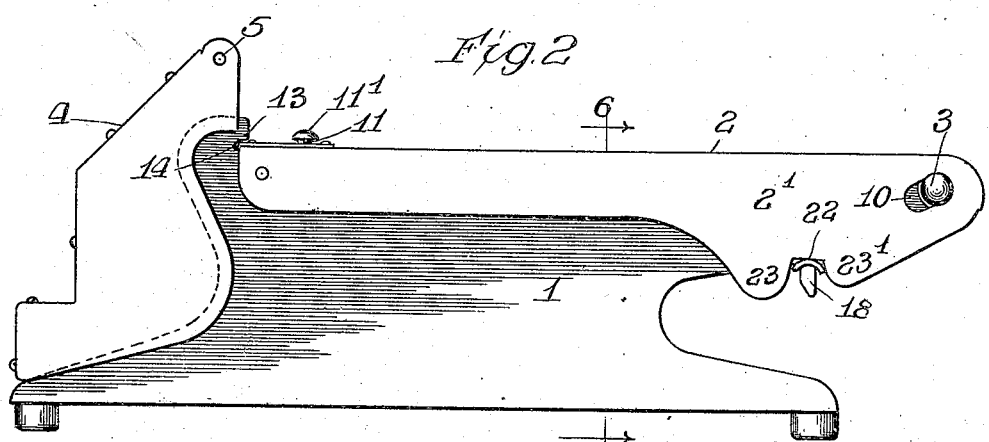
Witnesses:
Harry R. White
M. A. Kiddie
Inventor:
Frank H. Chase
By Wm. T. Belt, Atty

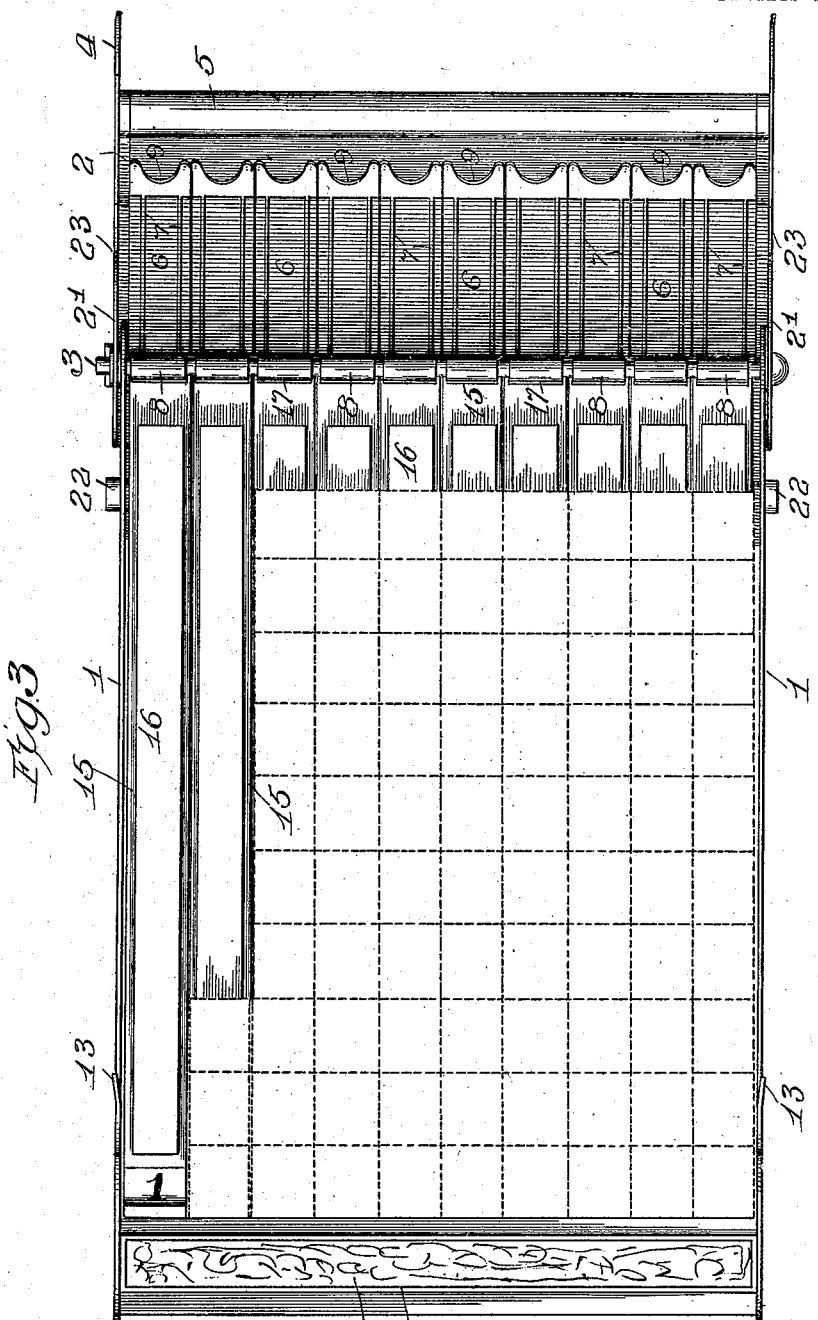

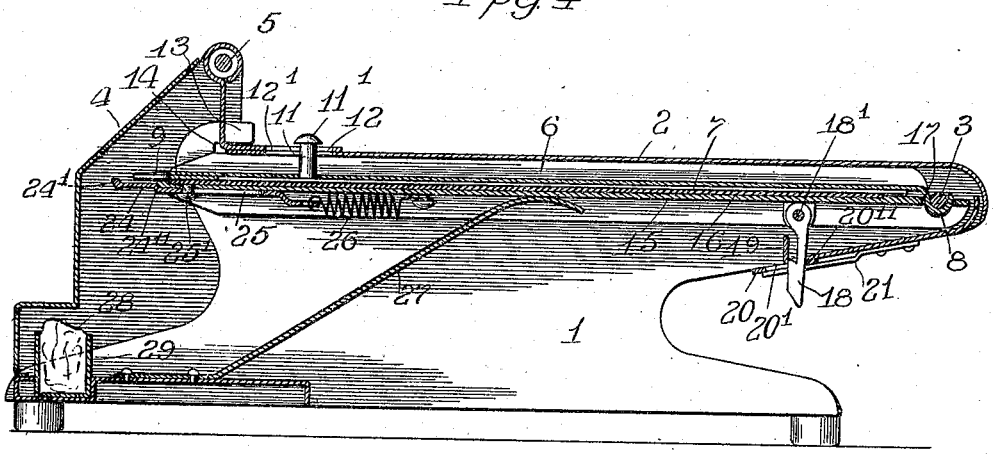
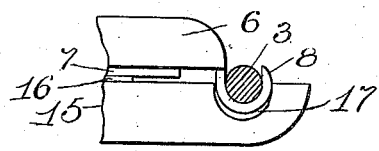
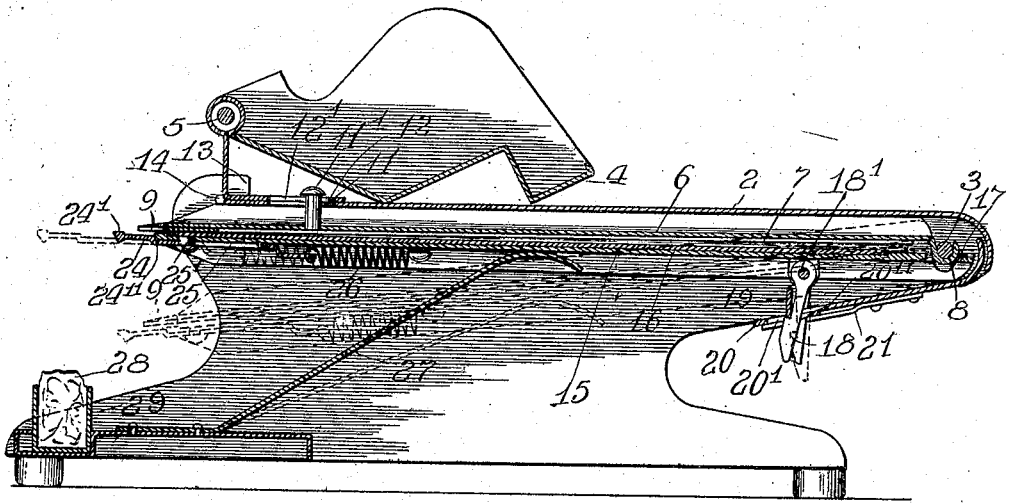

F. H. CHASE.
STAMP CABINET.
APPLICATION FILED JULY 17, 1908.
920,913.
Patented May 11, 1909.
4 SHEETS—SHEET 4.
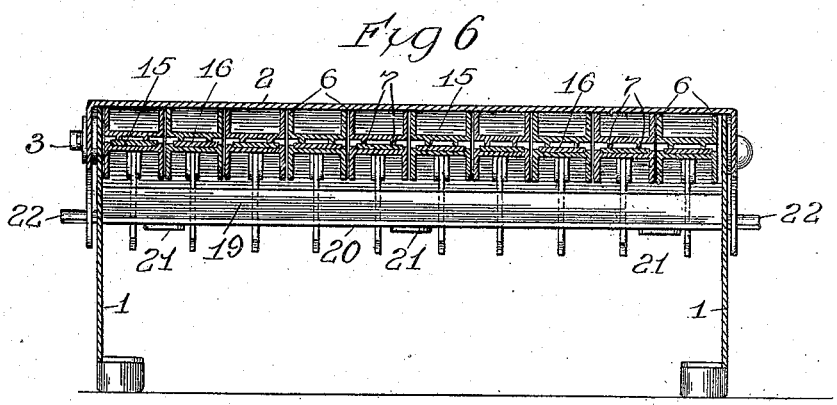
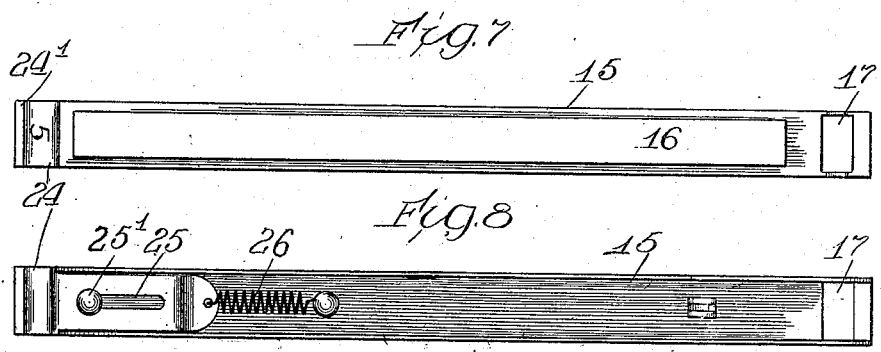
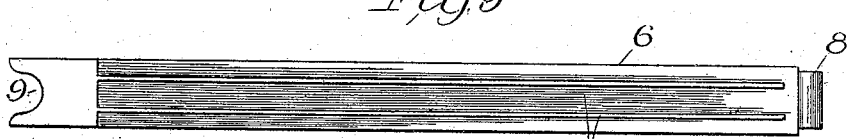
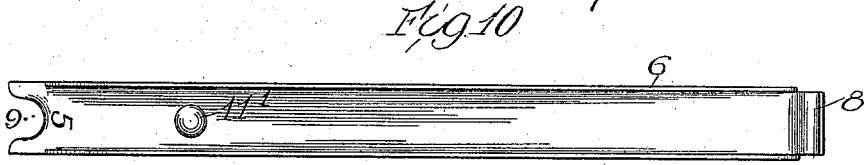
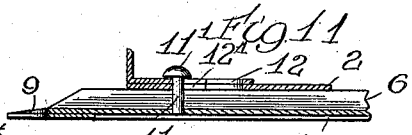
Witnesses
Harry R L White
M. A. Kiddie
Inventor
Frank H Chase
By Wm F Belt Atty

UNITED STATES PATENT OFFICE.

FRANK H. CHASE, OF CHICAGO, ILLINOIS.

STAMP-CABINET.

No. 920,913.   Specification of Letters Patent.   Patented May 11, 1909.

Application filed July 17, 1908. Serial No. 443,969.

*To all whom it may concern:*

Be it known that I, FRANK H. CHASE, a citizen of the United States, residing at Chicago, in the county of Cook and State of Illinois, have invented new and useful Improvements in Stamp-Cabinets, of which the following is a specification.

The object of this invention is to provide a cabinet of simple and inexpensive construction and compact form for holding stamps so that they can be conveniently dispensed in small quantities.

The invention provides a cabinet to receive a sheet comprising a plurality of stamps separated by lines of perforations and adapted to be operated to divide the sheet along lines of perforations into strips after which the stamps in each strip may be conveniently dispensed one at a time or in greater numbers.

The cabinet is designed particularly for use by proprietors of drug stores, cigar stores and newsstands and other establishments where stamps are stored from time to time and at irregular intervals in small quantities, and also in post offices.

The cabinet is also adapted for general office use as it forms a convenient means for holding and protecting stamps until they are used.

Another object of the invention is to provide the cabinet with a moistening pad conveniently arranged to be engaged by the stamp to be dispensed so that it can be immediately affixed to the envelop.

In the accompanying drawings illustrating one embodiment of the invention Figure 1 is a top plan view. Fig. 2 is a side elevation. Fig. 3 is a top plan view showing the cabinet in open position with a sheet of stamps therein. Fig. 4 is a longitudinal sectional view on the line 4—4 of Fig. 1 showing the parts in normal position. Fig. 5 is a view similar to Fig. 4 showing the front swung to open position and also showing, in broken lines, the position which the parts assume in separating a strip from the sheet. Fig. 6 is a transverse sectional view on the line 6—6 of Fig. 2. Fig. 7 is a top plan view of one section of the stamp base. Fig. 8 is a bottom plan view of one section of the stamp base. Figs. 9 and 10 are respectively bottom and top plan views of one section of the clamping member. Fig. 11 is a detail sectional view on the line 11—11 of Fig. 1 omitting the front. Fig. 12 is a detail enlarged sectional view at the rear ends of a pair of clamping and bed sections.

Referring to the drawings, the cabinet consists of a frame 1 of suitable form which comprises a top 2 mounted to swing on a rod 3 supported in the frame at the rear end thereof and a front 4 mounted to swing on the top 2 at 5.

The clamping member comprises a plurality of sections 6 made preferably in channel form (Fig. 6) and provided with ribs 7 to engage the stamps. These clamping sections are each provided at the rear end with a socket hook 8 to engage the pivot rod 3 and at the front end with a recess 9 to enable the stamp to be grasped as hereafter described.

The pivot rod 3 projects through elongated slots 10 in the depending sides 2′ of the top 2 so that said top, and the front, when the latter is thrown to open position, as shown in Fig. 5, may have a limited longitudinal movement on the frame. A stud 11 mounted on the top of each clamping section, near its front end, is arranged to project up through an opening 12 in the top 2 (Fig. 11). The opening 12 is of sufficient size to receive the head 11′ of the stud when the top is in forward position and it has a contracted slot 12′ communicating therewith to receive the shank of the stud when the top is in rearward position to which it must be moved before it can be swung open.

Means are provided for locking the top in closed position and in the drawings I have shown the frame provided with hooks 13 to be engaged by the front edge 14 of the top when the latter is moved forward in closed position (Fig. 2). It will be understood that when the top is closed and locked by engagement with the hooks 13 the studs 11 will register with the openings 12 (Figs. 4, 5), and when the top is moved rearward to disengage it from the hooks 13 the slots 12′ in the top will engage the studs 11, so that when the top is swung to open position the sections of the clamping member are locked thereto and will swing with the top, thus leaving the bed free to receive the sheet of stamps.

The stamp bed comprises a plurality of sections 15 arranged side by side and each provided with a top facing 16 of rubber or equivalent material (Fig. 7). These bed sections are preferably made in channel form (Figs. 6, 8) and are provided at their rear ends with a socket 17 to engage the socket hooks 8 of the clamping sections (Fig. 12). A dog 18, in the form of a hook, is pivoted at 18′ to the underside of each bed section 15 and is adapted to engage a cross bar 19 on the frame beneath the bed. A movable locking and releasing plate 20 is supported in guides 21 on the frame beneath the cross bar 19 and is provided with openings 20″ which register with openings 20″ in the frame adjacent to the cross bar 19 and through which registered openings the dogs 18 extend (Fig. 4). The ends 22 of the plate 20 project beyond the sides of the frame between shoulders 23 and 23′ on the sides 2′ of the top (Fig. 2).

A dispensing slide 24 is supported on the underside of each bed section 15 and projects beyond the front thereof and is provided with a bead or rib 24′. The slide has a longitudinal slot 25 to receive the rivet or pin 25′ whereby the slide is held in place on the bed section and is guided in its longitudinal movement. A spring 26 is attached to the rear end of the slide and to the bed section to hold the slide normally retracted. The rearward movement of the slide may be limited by the engagement of a shoulder 24″ on the slide with the front end of the bed section or by the engagement of the rivet or pin 25′ with the front end of the slot 25 or by both.

The bed sections are supported in substantially horizontal position by plate springs 27 which are fastened to the frame and engage the underside of the bed sections between their ends and preferably about midway (Fig. 4).

A sponge 28 or other moistening pad may be arranged in a receptacle 29 at the front of the frame in convenient position to be engaged by a stamp before it is detached. The front 4 is made to cover the moistening pad and the dispensing mechanism at the front of the machine and it may be locked to the frame in any suitable manner.

To fill the cabinet the front is thrown open to the position shown in Fig. 5 and the top is moved rearward until it is disengaged from the hooks 13. This rearward movement of the top carries the slots 12′ into engagement with the studs 11 and thereby locks the several sections of the clamping member to the top. The rearward movement of the top also engages the shoulders 23 with the projecting ends 22 of the plate 20 and shifts said plate to release the dogs 18 from engagement with the cross bar 19. The top is then swung to open position (Fig. 3) and a sheet of stamps is arranged on the bed. A sheet of stamps as now issued by the Post Office Department comprises one hundred stamps arranged in rows of ten, there being lines of perforations which cross each other so that the sheet may be readily divided into strips of ten stamps each and the stamps in each strip may be readily separated on the lines of perforations. The cabinet is constructed to receive a complete sheet of one hundred stamps but it will readily appear that a smaller sheet may be arranged in the cabinet whenever desired. The sheet is arranged on the bed so that the lines of perforations which extend lengthwise of the sheet will register with the side edges of adjacent sections of the bed, and as the sections of the clamping member register with the sections of the bed the stamps will be securely held on the bed by the clamping member when the top is secured in closed and locked position and in such manner that the sheet may be readily divided into strips along the lengthwise lines of perforations. After the sheet has been properly arranged on the bed the top is swung to closed position and moved forward to locked position. The forward movement of the top carries the shoulders 23′ into engagement with the projecting ends 22 of the plate 20 and moves said plate forward so that the dogs 18 may be engaged with the cross bar 19. At this time the bed sections are yieldingly supported by the springs 27 and their rear ends are engaged with the socket hooks of the clamping sections, these socket hooks being engaged with the pivot rod. Thus the bed sections are fulcrumed at their rear ends on the pivot rod 3.

In dispensing the stamps one strip will preferably be separated at a time and the second strip will not be separated until all the stamps of the first strip are dispensed. To separate a strip from the rest of the sheet the pair of bed and clamping sections holding the stamps of the strip to be separated are depressed by pressure applied thereon at the front end. These sections operate with a shearing action to cut the sheet along the line of perforations and separate the strip held thereby. At the same time the dog on the bed section is swung into engagement with the cross bar 19 and thereby the fulcrum of the bed section is shifted from the pivot rod 3 to the dog and cross bar, as shown in broken lines in Fig. 5. The dog and the cross bar are constructed and arranged so that the dog will not engage the cross bar until the bed section has been depressed and when these parts are engaged the rear end portion of the bed section will be held, upon the return of the forward end of the bed section to normal position, in a lower position than it was formerly held when fulcrumed on the pivot rod 3. In this position the rear end of the bed section is tilted downward while the forward end is pressed up against the clamping member. Thereby the friction of the stamp strip is provided mainly at the front of the machine. It will therefore be understood that before the strip is separated it is securely held throughout its length between the clamping section and the bed section, in fact the entire sheet is thus held before any strip has been separated, and this clamping action is not released as to each strip until it is separated from the sheet and then it is not released at the front of the machine.

To remove a stamp from the strip which has been separated from the sheet the first stamp, which projects above the end of the slide in front of the shoulder 24″ and the slide are grasped between the thumb and forefinger and the slide is pulled out and released, leaving the first stamp projecting beyond the rib 24′. Then the first stamp may be detached from the second stamp by tearing it along the transverse line of perforations and on the rib. Thus the second stamp is left in position to be dispensed at the next operation and as the first stamp on each bed section is always exposed to view the operator can see at a glance its denomination. Therefore the machine may be supplied with stamps of various denominations and the operator will have no trouble in distinguishing them. The construction is such that the slide can be pulled out a distance equal to the length of a stamp so that the stamp to be dispensed will be properly positioned for separation from the next stamp when the slide is released and returned by the spring to normal position. If it is desired to affix the stamp at once it can be moistened by engagement with the bed before or after it is detached.

What I claim and desire to secure by Letters Patent is:

1. In a stamp cabinet, a stamp bed adapted to support an integral sheet consisting of a plurality of connected stamps, said bed comprising a plurality of long narrow sections arranged side by side and each adapted to support a row of stamps in the sheet before and after the rows are separated.

2. In a stamp cabinet, a stamp bed adapted to support an integral sheet consisting of a plurality of connected stamps, said bed comprising a plurality of independently movable long narrow sections arranged side by side and each adapted to support a row of stamps in the sheet before and after the rows are separated.

3. In a stamp cabinet, a stamp bed adapted to support a sheet of stamps and comprising a plurality of long narrow sections arranged to swing independently in the arc of a circle and each adapted to support a row of stamps in the sheet.

4. In a stamp cabinet, a stamp bed adapted to support a sheet of stamps and comprising a plurality of long narrow sections each pivotally mounted at one end to swing in the arc of a circle and adapted to support a row of stamps in the sheet.

5. In a stamp cabinet, a stamp bed adapted to support a sheet of stamps and comprising a plurality of long narrow sections each pivotally mounted at one end to swing in the arc of a circle and adapted to support a row of stamps in the sheet, and a rubber facing on the top of each section.

6. In a stamp cabinet, a stamp bed adapted to support a sheet of stamps and comprising a plurality of long narrow sections each pivotally mounted at one end to swing in the arc of a circle and adapted to support a row of stamps in the sheet, said sections being made in channel form and each provided with a pivot engaging socket at its rear end.

7. In a stamp cabinet, a stamp bed adapted to support a sheet of stamps and comprising a plurality of long narrow sections arranged side by side and each adapted to support a row of stamps in the sheet, and a dispensing slide at the front end of each section and movable relatively to said section.

8. In a stamp cabinet, a stamp bed adapted to support a sheet of stamps and comprising a plurality of long narrow sections arranged side by side and each adapted to support a row of stamps in the sheet, and a dispensing slide carried by each section at its front end and projecting beyond said end and movable relatively to said section.

9. In a stamp cabinet, a stamp bed adapted to support a sheet of stamps and comprising a plurality of long narrow sections arranged side by side and each adapted to support a row of stamps in the sheet, and a spring controlled dispensing slide carried by each section at its front end and movable relatively to said section.

10. In a stamp cabinet, a stamp bed adapted to support a sheet of stamps and comprising a plurality of long narrow sections arranged side by side and each adapted to support a row of stamps in the sheet, and a dispensing slide at the front end of and projecting beyond said end of each section and movable relatively thereto, said slide having a shoulder to engage the end of the section and limit its inward movement.

11. In a stamp cabinet, a stamp bed adapted to support a sheet of stamps and comprising a plurality of long narrow sections arranged side by side and each adapted to support a row of stamps in the sheet, and a dispensing slide at the front end of and projecting beyond said end of each section and movable relatively thereto, said slide having a transverse rib at its outer end.

12. In a stamp cabinet, a stamp bed adapted to support a sheet of stamps and comprising a plurality of long narrow sections arranged side by side and each adapted to support a row of stamps in the sheet, a dispensing slide at the front end of and projecting beyond said end of each section and movable relatively thereto, a spring acting on said slide to hold it normally in retracted position, and means for limiting the movement of the slide.

13. In a stamp cabinet, a stamp bed comprising a plurality of sections, each section having a pivot engaging socket at one end and a dispensing slide at the other end.

14. In a stamp cabinet, a stamp bed comprising a plurality of sections, each section being initially fulcrumed at one end, and means for changing said fulcrum to a point removed from said end.

15. In a stamp cabinet, a stamp bed comprising a plurality of sections, a hooked dog suspended from each section, a cross bar, and means for moving the dog into position to engage said cross bar.

16. In a stamp cabinet, a stamp bed comprising a plurality of sections, a hooked dog suspended from each section, a cross bar, and means for releasing the dog from the cross bar.

17. In a stamp cabinet, a stamp bed comprising a plurality of sections, a hooked dog suspended from each section, a cross bar, and combined means for moving the dog into position to engage said cross bar and for releasing the dog from the cross bar.

18. In a stamp cabinet, a stamp bed comprising a plurality of sections, a hooked dog suspended from each section, a cross bar, and a slidable plate for moving the dog into position to engage said cross bar and for releasing the dog from the cross bar.

19. In a stamp cabinet, a stamp bed comprising a plurality of sections, a hooked dog suspended from each section, a cross bar, a slidable plate for moving the dog into position to engage said cross bar and for releasing the dog from the cross bar, and a movable top on the cabinet arranged to engage and move said plate.

20. In a stamp cabinet, a stamp bed comprising a plurality of sections, a hooked dog suspended from each section, a cross bar, a slidable plate for moving the dog into position to engage said cross bar and for releasing the dog from the cross bar, a movable top on the cabinet, and shoulders on said top to engage the ends of said plate and move the same.

21. In a stamp cabinet, a stamp bed adapted to support a sheet of stamps and comprising a plurality of long narrow sections arranged side by side and each adapted to support a row of stamps in the sheet, each section being fulcrumed to swing in the arc of a circle, and a spring sustaining each section in normal position.

22. In a stamp cabinet, a stamp bed adapted to support a sheet of stamps and comprising a plurality of long narrow sections arranged side by side and each adapted to support a row of stamps in the sheet, each section being initially fulcrumed at the back of the machine to swing in the arc of a circle, means for changing the fulcrum of said sections, and a spring for each section in front of the final fulcrum thereof and normally supporting the section in substantially horizontal position.

23. In a stamp cabinet, a clamping member adapted to engage a sheet of stamps and comprising a plurality of long narrow sections arranged side by side and each adapted to engage a row of stamps in the sheet, said sections being movable conjointly and independently.

24. In a stamp cabinet, a stamp bed adapted to support a sheet of stamps and comprising a plurality of long narrow sections arranged side by side and each adapted to support a row of stamps in the sheet, and a clamping member comprising a plurality of long narrow sections registering with the bed sections, each of said clamping sections being adapted to engage the row of stamps on a bed section.

25. In a stamp cabinet, a stamp bed adapted to support a sheet of stamps and comprising a plurality of long narrow sections arranged side by side and each adapted to support a row of stamps in the sheet, and a clamping member comprising a plurality of long narrow sections registering with the bed sections and movable therewith, each of said clamping sections being adapted to engage the row of stamps on a bed section.

26. In a stamp cabinet, a stamp bed adapted to support a sheet of stamps and comprising a plurality of independently movable long narrow sections arranged side by side and each adapted to support a row of stamps in the sheet, and a clamping member comprising a plurality of long narrow sections registering with the bed sections and movable therewith and independently of each other, each of said clamping sections being adapted to engage the row of stamps on a bed section.

27. In a stamp cabinet, a stamp bed adapted to support a sheet of stamps and comprising a plurality of sections, a clamping member adapted to engage the sheet on the bed and comprising a plurality of sections, said bed and clamping sections being movable in pairs to separate strips from the sheet, and means for securing said clamping member in place.

28. In a stamp cabinet, a pivoted top, a clamping member, and means for engaging said clamping member with the top to move therewith.

29. In a stamp cabinet, a pivoted top, a clamping member comprising a plurality of sections, and means for engaging each section with the top to move therewith.

30. In a stamp cabinet, a clamping member fulcrumed to swing in the arc of a circle, and a top mounted to swing with the clamping member and slidable independently thereof.

31. In a stamp cabinet, a clamping member fulcrumed to swing in the arc of a circle and comprising a plurality of sections, a stud on each section, and a slidable top adapted to engage said studs to swing said clamping member.

32. In a stamp cabinet, a stamp bed adapted to receive a sheet of stamps and comprising a plurality of sections, a clamping member adapted to engage the sheet on the bed and comprising a plurality of sections registering with the bed sections, said bed and clamping sections being movable in pairs to separate strips from the sheet, and means for separating said sections except the forward parts thereof after a strip has been separated from the sheet.

33. In a stamp cabinet, a stamp bed adapted to receive a sheet of stamps and comprising a plurality of sections, a clamping member adapted to engage the sheet on the bed and comprising a plurality of sections registering with the bed sections, said bed and clamping sections being movable in pairs to separate strips from the sheet, and means for re-adjusting the bed section to separate it from the clamping section at the rear portion thereof.

34. In a stamp cabinet, the combination of a bed, and a clamping member bodily movable relative to the bed and adapted to engage a sheet of stamps on the bed, said clamping member comprising a plurality of separate and independent sections arranged side by side and each adapted to engage a row of stamps in the sheet.

35. In a stamp cabinet, the combination of a bed, and a clamping member adapted to engage a sheet of stamps on the bed and comprising a plurality of separate and independent sections arranged side by side and each adapted to engage a row of stamps in the sheet, said clamping member being bodily movable relative to the bed and each of said sections being independently movable.

FRANK H. CHASE.

Witnesses:
W<small>M</small>. O. B<small>ELT</small>,
M. A. K<small>IDDIE</small>.